UNITED STATES PATENT OFFICE.

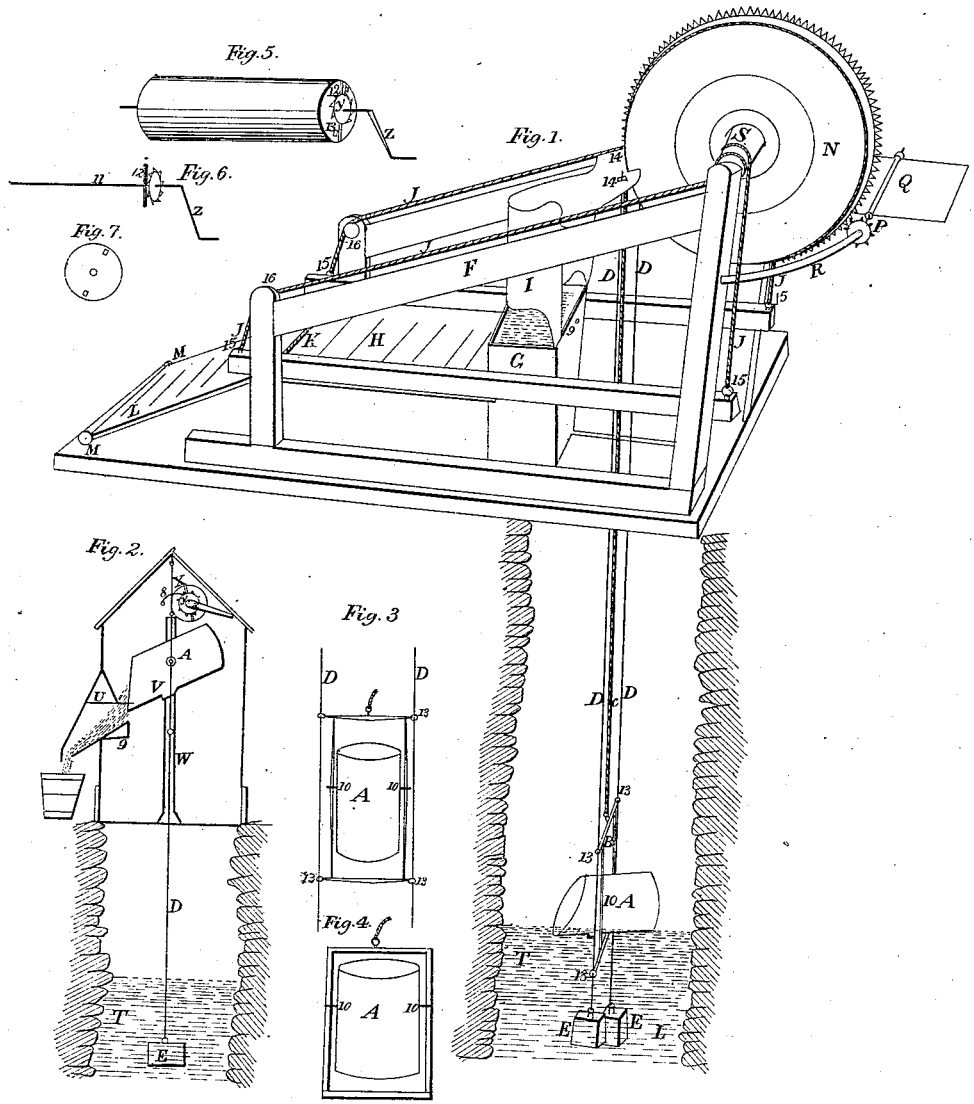

CALEB WINEGAR, OF UNION SPRINGS, NEW YORK.

METHOD OF DRAWING WATER FROM WELLS.

Specification of Letters Patent No. 13,446, dated August 14, 1855.

*To all whom it may concern:*

Be it known that I, CALEB WINEGAR, of Union Springs, in the county of Cayuga, in the State of New York, have invented a new and useful Machine Called "Winegar's Water-Elevator" for Elevating Water and other Fluids; and I do hereby declare that the following is a full, clear, and exact description of the construction and operation of the same, reference being had to the annexed drawings, making a part of this specification in which—

Figure 1 is a perspective view; Fig. 2, a side view of a hand windlass elevating apparatus exhibiting the manner of emptying the bucket; Fig. 3, a separate and front view of the bucket-bail or gate with a view of the wire ways; Fig. 4, a like view of the bucket with a gate bail calculated for wooden ways; Fig. 5 represents a hand windlass that is so constructed that when the bucket is empty and a return of the bucket is desired, a horizontal pull lets the drum that holds the rope or chain run back to the water, while the crank and crank shaft are kept stationary by the ratchet wheel 12 and spring catch 8, and when the bucket is filled crowd the crank the other way and it attaches the drum, and thus the water is elevated; Figs. 6 and 7 represent parts that are combined in Fig. 5, and applied in Fig. 2.

In the said perspective view Fig. 1, A represents the bucket; B, the gate bail; C, the rope or chain that is attached to the gate bail and leads to the large windlass N; D—D, the wires that run from the points 14 where they are firmly fastened perpendicularly to the weights E—E at or near the bottom of the water; T, Fig. 10, the point that attaches the said bucket to the bail gate B; D—D, the wires upon which holes 13 in said bail slide upon said wires when the water is elevated in the bucket returned for water. Thus the bucket is held surely and safely upon said wire ways. The weights E—E are let down by said wires until they touch the bottom and are then elevated enough to clear the bottom of the well, and they thus hang the same as the plummet and line exactly parallel and perpendicular, forming the most perfect and cheap contrivance for harnessing in the said bucket that can be imagined, the bucket gate frame, &c., hanging perpendicular from the windlass N, the same that the said wires hang from the points 14. The bucket A is just in the act of dipping; it will be readily seen that the bucket has perfect liberty to turn either backward or forward to fill or dip, and as soon as the power is applied to the ropes or chain C and windlass N it rights up with its burden of water and elevated as hereinafter described surely without any danger of the bucket being bruised or injured against the rough stones in a well and is conducted safely without spilling until it reaches the points of tilting.

F is the frame work that holds the platform; H, large wheel or windlass; N, the fly or fan wheel, &c., that are used to enable an animal to raise their own drink; L, the part of the platform that is attached to the platform H at the point K by a hinge; M—M, rollers that roll out when the platform descends with the animal; C, the trough that holds the water when elevated and from which the creature drinks; I, the protection to confine the water at the time of tilting so that no water is wasted. The double platform L, H, are attached to the chains or ropes at the points 15, and the said ropes or chains are carried over the pulleys 16, and thence to the shaft S of the large windlass from one end and from the other are carried nearly straight up to said shaft and they are all attached, wound and unwound upon the same, so that when a creature steps upon the platform the whole weight of the animal is applied to turn the windlass and raises the bucket confined as aforesaid until the bucket projection V strikes the first tilting pin 9, which partially turns the bucket and which turning is continued by the top of the bucket striking a tilting pin that cannot be seen in Fig. 1, but is fully explained in Fig. 2 hereafter, and thus the emptying is completed. The bucket is usually made of metal. Galvanized iron makes an excellent bucket and the bucket is made of sufficient size to water any animal and the trough G holds water enough to supply small animals. The animal causes the platform to descend until the platforms L and H are in the same place and in descending turns the large windlass N, which raises the bucket and empties it, as before described. When the animal has drank and leaves the platform the heft of the bucket overbalances the platform, the bucket descends and dips and is ready for the next animal. The fan wheel Q is applied where the depth of the well renders it necessary to govern the motion which it does most beautifully. The fan wheel is driven by the gear O meshing into the pinion P.

Fig. 2 best explains the manner the bucket is held and tilted. The frame in Fig. 1 hides the highest tilting pin. In Fig. 2 it will be seen that after the bucket is partially tilted by the first contact at V and 9 the top of the bucket strikes the tilting pin U and thus the tilting is completed without a particle of waste. The said gate bail can be run either in wooden ways or wires as before described, and when wires are used the substantial way W about $2\frac{1}{2}$ feet in length is firmly fastened to each side of the curb or machine in such a manner that the said gate is conducted by the said wires into said substantial ways, W and are held in said ways while being tilted. The said short ways take all strain from the said wire ways, so that small wires answer every purpose.

I claim—

The guiding of the bucket by means of two wires, or their equivalent suspending two weights near the bottom of the well, in combination with the gate frame in the manner described.

CALEB WINEGAR.

Witnesses:
ZECHARIAH S. WINEGAR,
SILAS S. BLISS.